US010161623B2

(12) United States Patent
Martinangeli

(10) Patent No.: US 10,161,623 B2
(45) Date of Patent: Dec. 25, 2018

(54) ILLUMINATED BOARD

(71) Applicant: Franco Martinangeli, Miami, FL (US)

(72) Inventor: Franco Martinangeli, Miami, FL (US)

( * ) Notice: Subject to any disclaimer, the term of this patent is extended or adjusted under 35 U.S.C. 154(b) by 12 days.

(21) Appl. No.: 15/296,854

(22) Filed: Oct. 18, 2016

(65) Prior Publication Data

US 2018/0106470 A1   Apr. 19, 2018

(51) Int. Cl.
| | | |
|---|---|---|
| *B63B 35/85* | (2006.01) | |
| *F21V 31/00* | (2006.01) | |
| *F21V 33/00* | (2006.01) | |
| *H02J 7/00* | (2006.01) | |
| *B63B 35/79* | (2006.01) | |
| *F21S 9/02* | (2006.01) | |
| *F21S 10/06* | (2006.01) | |
| *F21V 23/02* | (2006.01) | |
| *F21V 23/04* | (2006.01) | |
| *F21W 121/00* | (2006.01) | |
| *F21Y 115/10* | (2016.01) | |
| *F21W 107/20* | (2018.01) | |

(52) U.S. Cl.
CPC ........ *F21V 33/008* (2013.01); *B63B 35/7906* (2013.01); *B63B 35/85* (2013.01); *H02J 7/0045* (2013.01); *F21S 9/02* (2013.01); *F21S 10/06* (2013.01); *F21V 23/02* (2013.01); *F21V 23/04* (2013.01); *F21V 31/00* (2013.01); *F21W 2107/20* (2018.01); *F21W 2121/00* (2013.01); *F21Y 2115/10* (2016.08)

(58) Field of Classification Search
CPC .... F21V 33/008; F21V 23/009; F21V 23/023; F21V 23/06; F21V 31/00; F21V 23/02; F21V 23/04; B63B 35/7906; B63B 35/85; F21W 2107/00; H02J 7/0045; F21S 9/02; F21S 10/06; F21Y 2115/10

See application file for complete search history.

(56) References Cited

U.S. PATENT DOCUMENTS

| | | | | |
|---|---|---|---|---|
| 4,675,575 A | * | 6/1987 | Smith | ....................... F21S 4/10 |
| | | | | 250/552 |
| 6,802,636 B1 | | 10/2004 | Bailey, Jr. | |

(Continued)

OTHER PUBLICATIONS

Google Patent Search.*
Lytec El Wires.*

*Primary Examiner* — Diane I Lee
*Assistant Examiner* — Naomi M Wolford
(74) *Attorney, Agent, or Firm* — Albert Bordas, P.A.

(57) ABSTRACT

A buoyant illuminated board having a board assembly with a deck, a bottom, first and second lateral sides, and at least one aperture. An electrical system has a power source, and at least one light source within the at least one aperture. A hatch assembly has a lid, and a housing that defines a cavity. The electrical system further comprises a controller, an amplifier, and a battery charger connector that are housed within the hatch assembly along with the power source. The at least one aperture may be elongated to define a channel. The at least one light source is a bulb, a light, a lamp, a light-emitting diode, a light-emitting diode strip, or rope lighting. The board assembly also has an exterior cover that covers the at least one light source within the at least one aperture, and may have a battery charger to recharge the power source.

1 Claim, 6 Drawing Sheets

(56) References Cited

U.S. PATENT DOCUMENTS

| | | | |
|---|---|---|---|
| 7,942,450 B2* | 5/2011 | Kawano | A63C 5/003 |
| | | | 280/816 |
| 8,038,313 B1 | 10/2011 | Campbell | |
| 8,052,293 B2* | 11/2011 | Hurwitz | A63C 17/01 |
| | | | 362/253 |
| 8,083,238 B2 | 12/2011 | Borges | |
| 8,469,569 B1 | 6/2013 | Tunnicliffe | |
| 8,506,139 B2 | 8/2013 | Sherman et al. | |
| 9,366,404 B1 | 6/2016 | Porter | |
| 2007/0194558 A1 | 8/2007 | Stone et al. | |
| 2010/0048071 A1* | 2/2010 | Nascimento | B63B 35/85 |
| | | | 441/74 |
| 2012/0013094 A1 | 1/2012 | Golden-Justice | |
| 2013/0094231 A1 | 4/2013 | Sherman et al. | |
| 2014/0063828 A1* | 3/2014 | Roach | B63B 35/7933 |
| | | | 362/477 |
| 2014/0078760 A1 | 3/2014 | Rossini | |
| 2014/0111978 A1 | 4/2014 | Laurence | |
| 2015/0217675 A1* | 8/2015 | Dayan | A63C 5/03 |
| | | | 362/544 |

* cited by examiner

ILLUMINATED BOARD

BACKGROUND OF THE INVENTION

1. Field of the Invention

The present invention relates to boards, and more particularly, to illuminated boards for use in bodies of water.

2. Description of the Related Art

Applicant believes that one of the closest references corresponds to U.S. Patent Application Publication No. US 20140111978 A1, published on Apr. 24, 2014 to Peter David Laurence for a paddle. However, it differs from the present invention because Laurence teaches a paddle comprising an elongate handle, a paddle blade fixed to the elongate handle and an illumination source, wherein the illumination source illuminates at least part of the paddle blade.

Applicant believes that another reference corresponds to U.S. Patent Application Publication No. 20140078760 A1, published on Mar. 20, 2014 to William Thomas Rossini for a submersible lighting system for small watercraft. However, it differs from the present invention because Rossini teaches an underwater light-equipped watercraft system that includes a watercraft and a removable submersible lighting system. The lighting system includes a harness and a light unit coupled to the harness. The watercraft has a bottom surface that is disposed underwater when the watercraft is used in the water. The harness is removably mounted around at least a portion of the watercraft such that the light unit is disposed against the bottom surface of the watercraft.

Applicant believes that another reference corresponds to U.S. Patent Application Publication No. 20130094231 A1, published on Apr. 18, 2013 to Tyler Sherman, et al. for a LED sport board. However, it differs from the present invention because Sherman, et al. teaches an illuminated sports board having a top sheet with a board top surface, a core layer having an optional longitudinal groove, an LED strip that is mounted at least partially within the longitudinal groove, and a battery housing mounted on a top surface of the board. A switch is mounted to the battery housing. A first terminal is formed as an aperture mounted to the board top surface. The LED strip is mounted below the top sheet. A first terminal conductor is electrically connecting the first terminal to the LED layer. A second terminal is formed as an aperture mounted to the board top surface. A second terminal conductor electrically connects the second terminal to the LED layer. A first bolt makes electrical connection between the first terminal and the battery housing. A second bolt makes electrical connection between the second terminal and the switch.

Applicant believes that another reference corresponds to U.S. Patent Application Publication No. 20120013094 A1, published on Jan. 19, 2012 to Askilya Golden-Justice for an illuminated skateboard deck. However, it differs from the present invention because Golden-Justice teaches a skateboard deck, with electro-luminescent wire tubing embedded inside the skateboard deck on top and bottom, with a power supply source embedded inside the skateboard deck on bottom.

Applicant believes that another reference corresponds to U.S. Patent Application Publication No. 20070194558 A1, published on Aug. 23, 2007 to Christopher A. Stone, et al. for snowboards having integrated dynamic light displays related to snowboard motion. However, it differs from the present invention because Stone, et al. teaches selected patterns of lights that are displayed on a recreational conveyance such as a snowboard according to the motion of the board. A selection of patterns is stored in a processor memory, the motion of the board is measured and a pattern is selected from memory based on the measured motion. Then lights on the board are blinked on and off in the selected pattern. Accelerometer inputs are analyzed and a series of states is derived for each accelerometer axis. A series of states can be analyzed as a set to select a different pattern. Also, the magnitude of the states may affect the pattern selected. The process may be adaptive, so that the analyzing step further analyzes user weight or past snowboarding style to set adaptive thresholds for selecting patterns.

Applicant believes that another reference corresponds to U.S. Pat. No. 9,366,404 B1 issued to Dakota W. Porter on Jun. 14, 2016 for decorative lighting system for sporting equipment. However, it differs from the present invention because Porter teaches a decorative lighting system for sporting equipment that includes at least one strip of electrical lights, such as LED lamps, which are connected to an electrical power source via wiring, and which are attached to an article of sporting equipment such as a snowboard, snow skis, snowshoes, a skateboard, a bicycle, or the like. The decorative lighting system may be substantially waterproof, and may provide both an attractive appearance when the sporting equipment is used in low-light conditions, while making the sporting equipment more visible in darkness.

Applicant believes that another reference corresponds to U.S. Pat. No. 8,506,139 B2 issued to Tyler Sherman, et al. on Aug. 13, 2013 for a LED sport board. However, it differs from the present invention because Sherman, et al. teaches an illuminated sports board having a top sheet with a board top surface, a core layer having an optional longitudinal groove, an LED strip that is mounted at least partially within the longitudinal groove, and a battery housing mounted on a top surface of the board. A switch is mounted to the battery housing. A first terminal is formed as an aperture mounted to the board top surface. The LED strip is mounted below the top sheet. A first terminal conductor is electrically connecting the first terminal to the LED layer. A second terminal is formed as an aperture mounted to the board top surface. A second terminal conductor electrically connects the second terminal to the LED layer. A first bolt makes electrical connection between the first terminal and the battery housing. A second bolt makes electrical connection between the second terminal and the switch.

Applicant believes that another reference corresponds to U.S. Pat. No. 8,469,569 B1 issued to William Loftus Tunnicliffe on Jun. 25, 2013 for an illuminated sports board utilizing a battery or self-powered internal light source that is transmitted through the clear interior of the board in order to illuminate the board and any light altering elements contained in, or applied to, the board. However, it differs from the present invention because Tunnicliffe teaches a clear, frosted, or colored, transparent and/or translucent, plastic, or composite skateboard, snowboard, or any sports board material, that is illuminated with replaceable, rechargeable, or self-charging battery powered light emitting diodes which are placed inside the board within a drop-in, modular housing, which serves as a light engine and provides light that is transmitted through the interior of the board itself in order to illuminate light altering elements, which are embedded inside the board and/or etched, printed or applied to the surface of the board. This glowing light creates light patterns, flashing sequences, and glowing designs throughout the interior and exterior of the board.

Applicant believes that another reference corresponds to U.S. Pat. No. 8,083,238 B2 issued to Seth Borges on Dec. 27, 2011 for a lighting system for sporting apparatus. However, it differs from the present invention because Borges teaches a lighting system for a sporting apparatus. The sporting board apparatus includes an elongated board structure having top surface, a bottom surface, and edge surfaces. The sporting board apparatus further includes a light system having a plurality of light sources coupled to a power supply. In addition, the sporting board apparatus may include a switching mechanism to control the supply of electrical power from the power supply to the light sources, and a select mechanism to control one or more light programs.

Applicant believes that another reference corresponds to U.S. Pat. No. 8,038,313 B1 issued to Christopher Campbell on Oct. 18, 2011 for an illuminated sports board. However, it differs from the present invention because Campbell teaches a skate board having a deck, a pair of trucks mounted beneath the deck and equipped with wheels. The deck is equipped with a plurality of light emitting devices, such as LEDs, which are mounted to the deck in a distinct pattern. The LEDs are in electrical connection with an energy source, such as a rechargeable battery. The rechargeable battery is mounted into the deck in a removable pack, which can be charged without removing it from the deck. A microcontroller may be incorporated which provides for the selective illumination of the light emitting devices, and which may pulse, flicker, or create other aesthetically pleasing illumination patterns.

Applicant believes that another reference corresponds to U.S. Pat. No. 7,942,450 B2 issued to Horonobu Kawano, et al. on May 17, 2011 for a snowboard. However, it differs from the present invention because Kawano, et al. teaches a snowboard capable of drawing attention of a back sliding person. A snowboard including a board has a sole member, LEDs that are arranged between a snow contacting point of a nose side of the board and a snow contacting point of a tail side of the board, a front foot binding fixed to the board for fixing the front foot of a user, and a back foot binding fixed to the board for fixing the back foot of the user, wherein the sole member is translucent and covers the LEDs; and the LEDs are arranged in positions to emit light to the outside of the board through the sole member and are arranged between the front foot binding and the back foot binding to indicate the length between the front foot binding and the back foot binding.

Applicant believes that another reference corresponds to U.S. Pat. No. 6,802,636 B1 issued to Richard B. Bailey, Jr. on Oct. 12, 2004 for an illuminated recreational board. However, it differs from the present invention because Bailey, Jr. teaches an illuminated recreational board including a board having a top side, bottom side and peripheral side extending between said top and bottom sides. A plurality of recesses extends into the peripheral side of the board and a plurality of removable LED's positioned within respective ones of the plurality of recesses. A transparent cover is positioned on the peripheral side for protecting and covering the LED's. The LED's are connected to a device for illuminating the plurality of LED's in any of a number of different illumination sequences. The predetermined sequences include a flashing sequence, a strobing sequence, a twinkling sequence and a constant and continuous sequence. The recreational board may be formed as either a skateboard or a snowboard.

Other patents describing the closest subject matter provide for a number of more or less complicated features that fail to solve the problem in an efficient and economical way. None of these patents suggest the novel features of the present invention.

SUMMARY OF THE INVENTION

The present invention is an illuminated board, comprising a board assembly having a deck, a bottom, first and second lateral sides, and at least one aperture. An electrical system comprises a power source, and at least one light source within the at least one aperture. The board assembly is buoyant. In a preferred embodiment, the power source is a battery and is rechargeable.

The board assembly further comprises a hatch assembly and a second aperture to house the hatch assembly. The second aperture extends from the deck, and the hatch assembly extends from the deck a predetermined distance towards the bottom without reaching the bottom. The hatch assembly comprises a lid, and a housing that defines a cavity. The hatch assembly is impermeable. The housing comprises at least one hole, and at least one electrical connector extends through the least one hole to the at least one light source. In a preferred embodiment, the lid is approximately flush with the deck.

The electrical system further comprises a controller, an amplifier, and a battery charger connector. The hatch assembly houses the power source, the controller, the amplifier, and the battery charger connector.

In a preferred embodiment, the at least one aperture is elongated and defines at least one channel, and the at least one light source is a bulb, a light, a lamp, a light-emitting diode, a light-emitting diode strip, or rope lighting.

The board assembly further comprises an exterior cover that covers the at least one light source within the at least one aperture.

The illuminated board further comprises a battery charger to recharge the power source.

It is therefore one of the main objects of the present invention to provide a buoyant illuminated board for use in bodies of water.

It is another object of this invention to provide an illuminated board comprising a bottom that is disposed underwater when the illuminated board is used in the bodies of water.

It is another object of this invention to provide an illuminated board comprising a hatch assembly that houses a power source, a controller, an amplifier, and a battery charger connector.

It is another object of this invention to provide an illuminated board comprising at least one channel that receives a bulb, a light, a lamp, a light-emitting diode, a light-emitting diode strip, or rope lighting.

It is another object of this invention to provide an illuminated board that is volumetrically efficient for carrying, transporting, and storage.

It is another object of this invention to provide an illuminated board that can be readily assembled and disassembled without the need of any tools.

It is another object of this invention to provide an illuminated board, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
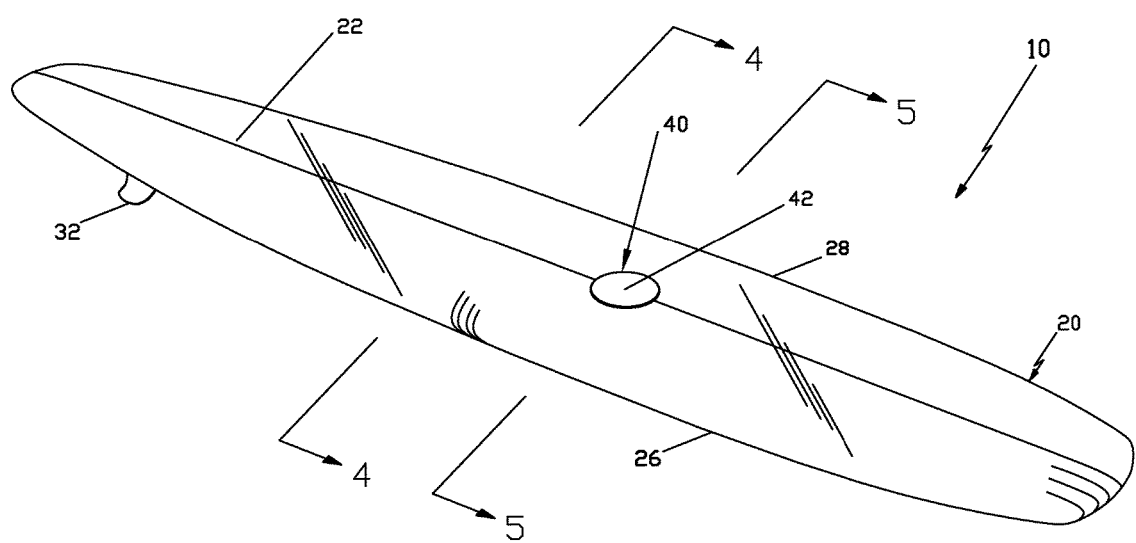
FIG. 1 represents an isometric top view of an illuminated board.

Referring now to the drawings, the present invention is an illuminated board and is generally referred to with numeral 10. It can be observed that it basically includes board assembly 20 comprising electrical system 60.

Figure 2:
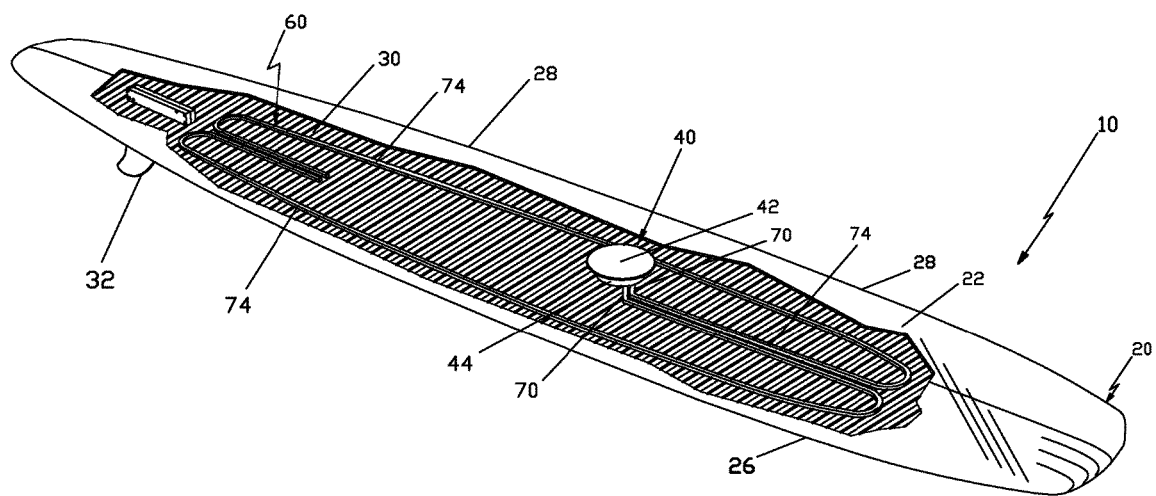
FIG. 2 is a top partial cross section of the illuminated board.
Figure 3:
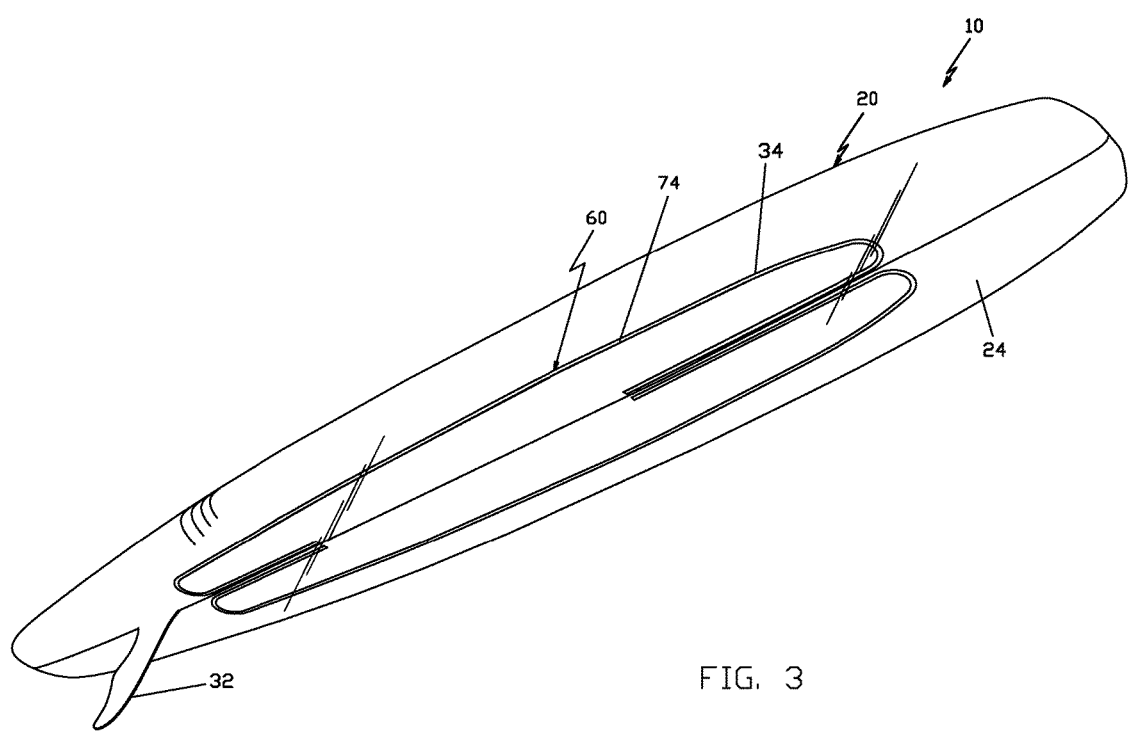
FIG. 3 is an isometric bottom view of the illuminated board.

As seen in FIGS. 1, 2, and 3, board assembly 20 is a paddleboard, surfboard, or any buoyant board used in a body of water. Such a paddleboard, surfboard, or any buoyant board used in a body of water can be an elongated platform that is relatively light, but strong enough to support an individual standing on it. They may comprise one or more fins on a bottom rear section of the board to improve directional stability. They may be made of polyurethane or polystyrene foam covered with layers of fiberglass cloth, and/or polyester epoxy resin, carbon fiber, and/or composites. The result is a light and strong board that is buoyant and maneuverable.

Board assembly 20 comprises deck 22, bottom 24, first and second lateral sides 26 and 28 respectively, and at least one aperture 34. In a preferred embodiment, at least one aperture 34 is elongated and defines at least one channel. Board assembly 20 is buoyant.

Electrical system 60 comprises a power source, and at least one light source within at least one aperture 34. In a preferred embodiment, the power source is a 12-volt battery 66 that is rechargeable. In a preferred embodiment, the at least one light source is a bulb, a light, a lamp, a light-emitting diode (LED), LED strip 74, or rope lighting.

Board assembly 20 further comprises exterior cover 38 that covers the at least one light source within at least one aperture 34.

Figure 4:
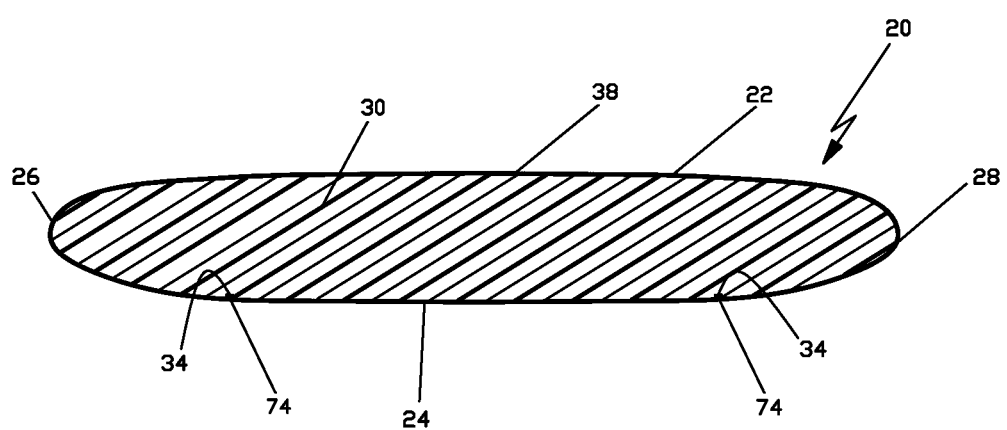
FIG. 4 is a cross section of the illuminated board taken along the lines 4-4 as seen in FIG. 1.

As seen in FIGS. 3 and 4, board assembly 20 may comprise fin 32. Board assembly 20 further comprises core 30 that may be made of, but not limited to, polyurethane or polystyrene foam covered with layers of fiberglass cloth, and/or polyesteror epoxy resin, carbon fiber, and/or composites.

Figure 5:
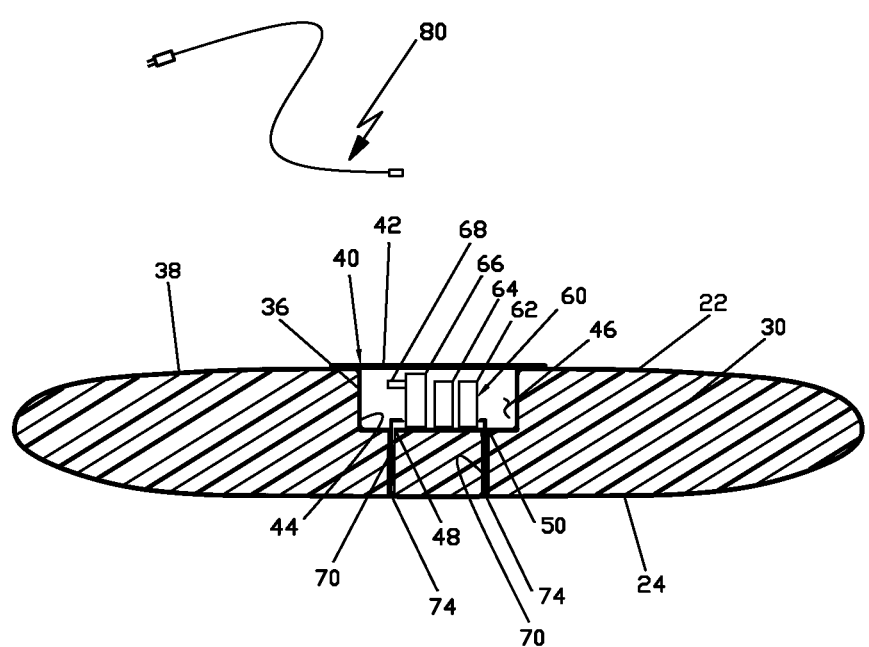
FIG. 5 is a cross section of the illuminated board taken along the lines 5-5 as seen in FIG. 1, with a battery charger.

As seen in FIG. 5, board assembly 20 further comprises hatch assembly 40, and second aperture 36 to house hatch assembly 40. Second aperture 36 extends from deck 22, and hatch assembly 40 extends from deck 22 a predetermined distance towards bottom 24 without reaching bottom 24. Hatch assembly 40 comprises lid 42, and housing 44 that defines cavity 46. Hatch assembly 44 is impermeable. Housing 44 comprises at least one hole 48, and may comprise hole 50, and at least one electrical connector 70 extends through at least one hole 48 and/or hole 50 to the at least one light source. In a preferred embodiment, lid 42 is approximately flush with deck 22.

Electrical system 60 further comprises controller 62, amplifier 64, and battery charger connector 68. It is noted that battery charger 80 may be connected to battery charger connector 68 to recharge battery 66. In a preferred embodiment, battery charger 80 connects to an electrical source such as a 120-volt source. Hatch assembly 40 houses the power source, controller 62, amplifier 64, and battery charger connector 68.

Bottom 24 is disposed underwater when board assembly 20 is in the body of water. When in use, light emitting from the at least one light source can be seen underwater. Such bodies of water include, but are not limited to, oceans, seas, lakes, rivers, lagoons, ponds, wetlands, pools, etc.

In addition, electrical system 60 may comprise a microcontroller and/or a remote control to provide for selective illumination of the at least one light source. The selective illumination may comprise change in color, a steady light, a pulsating light, a flickering light, and various illumination patterns.

Figure 6:
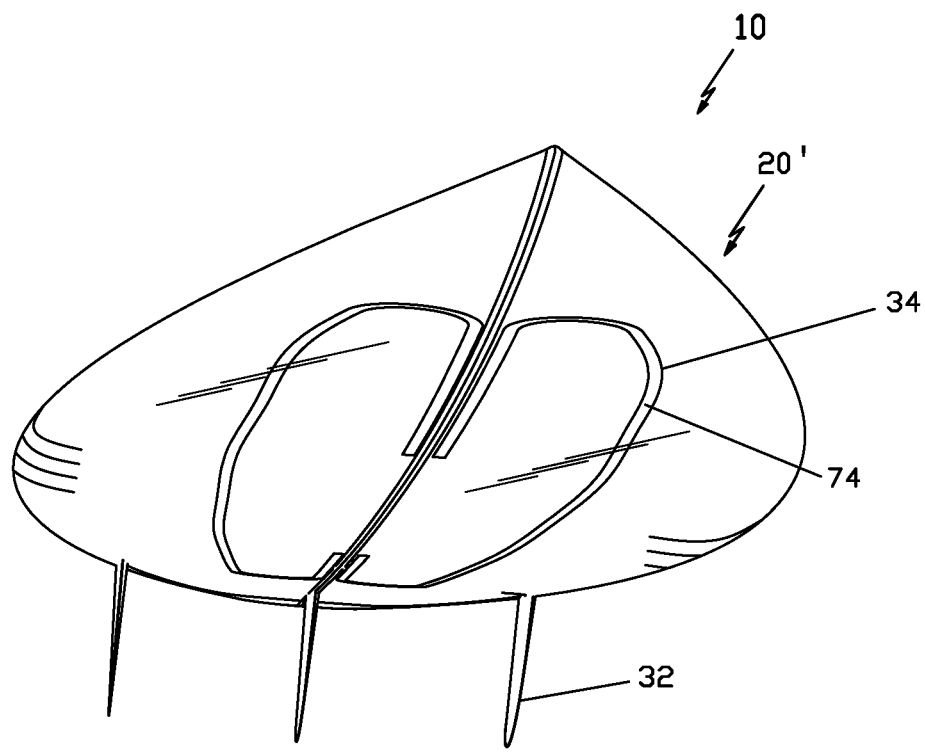
FIG. 6 represents an isometric top view of an alternate embodiment illuminated board.

Seen in FIG. 6 is an alternate embodiment board assembly 20' as a surfboard having three fins 32, and at least one light source within at least one aperture 34.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An illuminated board, consisting of:
A) a board assembly having a nose, a tail, a deck, a bottom, first and second lateral sides, first apertures that are symmetrical and elongated to define first and second channels, and a hatch assembly, said hatch assembly has a lid, and a housing that defines a cavity, said lid is approximately flush with said deck, said board assembly is buoyant and has a second aperture to house said hatch assembly, said second aperture extends from said deck, and said hatch assembly extends from said deck a predetermined distance towards said bottom without reaching said bottom, said hatch assembly is impermeable, said housing has first and second holes;
B) an electrical system having a power source, and first and second light sources within said first apertures, said first and second light sources extend symmetrically from said first apertures to said bottom, said first apertures abut said bottom and extend symmetrically towards said nose, then extend symmetrically towards said tail, then extend symmetrically towards said hatch assembly, said power source is a battery that is rechargeable, said electrical system further has a controller, an amplifier, and a battery charger connector, whereby first and second electrical connectors extend through said first and second holes and to said first and second light sources respectively, said first and second light sources are a light-emitting diode, a light-emitting diode strip, or rope lighting, and said hatch assembly houses said power source, said controller, said amplifier, and said battery charger connector, said board assembly further has an exterior cover that covers said first and second light sources within said first apertures, said bottom is disposed underwater when said board assembly is in a body of water, and when in use, light emitting from said first and second light sources can be seen underwater; and C) a battery charger.

\* \* \* \* \*